(12) United States Patent
Tijerina Ramos

(10) Patent No.: US 11,401,189 B2
(45) Date of Patent: Aug. 2, 2022

(54) GOB DISTRIBUTOR FOR A MACHINE FOR FORMING GLASS ARTICLES

(71) Applicant: Vitro, S.A.B. de C.V., Monterrey (MX)

(72) Inventor: Victor Tijerina Ramos, Monterrey (MX)

(73) Assignee: Vitro, S.A.B. de C.V., Nuevo León (MX)

( * ) Notice: Subject to any disclaimer, the term of this patent is extended or adjusted under 35 U.S.C. 154(b) by 201 days.

(21) Appl. No.: 16/495,477

(22) PCT Filed: Aug. 2, 2017

(86) PCT No.: PCT/MX2017/000087
§ 371 (c)(1),
(2) Date: Sep. 19, 2019

(87) PCT Pub. No.: WO2018/174702
PCT Pub. Date: Sep. 27, 2018

(65) Prior Publication Data
US 2020/0087188 A1    Mar. 19, 2020

(30) Foreign Application Priority Data

Mar. 23, 2017  (AR) .............................. 20170100725

(51) Int. Cl.
*C03B 7/14*     (2006.01)
*C03B 7/094*    (2006.01)
*C03B 7/00*     (2006.01)

(52) U.S. Cl.
CPC ................ *C03B 7/14* (2013.01); *C03B 7/005* (2013.01); *C03B 7/094* (2013.01)

(58) Field of Classification Search
None
See application file for complete search history.

(56) References Cited

U.S. PATENT DOCUMENTS

| 3,552,942 A | 1/1971 | Trudeau |
| 3,597,187 A | 8/1971 | Trudeau |

(Continued)

FOREIGN PATENT DOCUMENTS

| CL | 199201492 | 11/1993 |
| CO | 5300457 A1 | 7/2003 |

(Continued)

*Primary Examiner* — Queenie S Dehghan
(74) *Attorney, Agent, or Firm* — The Webb Law Firm

(57) ABSTRACT

A gob distributor for a glassware forming machine includes: a housing; an arcuate or straight scoop located above the housing, having an upper end aligned at all times with an orifice of a feeder, and which radially moves so that its lower end coincides with the upper ends of straight fixed channels of a forming machine; an independent support structure connected by each scoop; at least one first shaft vertically placed within the housing to rotate on its own axis, including a first gear section; at least one second shaft horizontally or vertically placed within the housing to rotate on its own axis, including a second gear section, each first gear section and each second gear section are coupled together to form a housing gear; and at least one motor coupled at each end of each second shaft to simultaneously move the supporting structures and scoops, radially.

17 Claims, 12 Drawing Sheets

(56) References Cited

U.S. PATENT DOCUMENTS

| | | | |
|---|---|---|---|
| 3,715,932 A * | 2/1973 | Sharp | F16H 57/0498 |
| | | | 74/42 |
| RE28,759 E | 4/1976 | Bystrianyk et al. | |
| 4,357,157 A | 11/1982 | Cardenas-Franco et al. | |
| 4,357,158 A | 11/1982 | Garza | |
| 4,529,431 A | 7/1985 | Mumford | |
| 4,636,238 A | 1/1987 | Sidler | |
| 4,687,502 A | 8/1987 | Douglas et al. | |
| 4,708,727 A | 11/1987 | Cardenas-Franco et al. | |
| 4,793,847 A | 12/1988 | Kawachi et al. | |
| 5,018,403 A * | 5/1991 | Umezono | B23F 13/08 |
| | | | 409/38 |
| 5,135,559 A | 8/1992 | Sasso et al. | |
| 5,637,128 A | 6/1997 | Rodriguez-Wong et al. | |
| 5,956,997 A * | 9/1999 | Oetjen | F16C 19/49 |
| | | | 74/424.94 |
| 6,557,380 B1 | 5/2003 | DiFrank et al. | |
| 2005/0022559 A1 * | 2/2005 | Hermening | C03B 7/16 |
| | | | 65/304 |
| 2006/0191736 A1 * | 8/2006 | Maeda | B62D 5/0409 |
| | | | 180/444 |
| 2008/0028796 A1 * | 2/2008 | Cramer | C03B 7/16 |
| | | | 65/304 |
| 2016/0107915 A1 | 4/2016 | Schiavo et al. | |
| 2016/0257594 A1 | 9/2016 | Johnston | |

FOREIGN PATENT DOCUMENTS

| | | |
|---|---|---|
| EP | 0180394 A1 | 5/1982 |
| EP | 0432833 A1 | 6/1991 |
| EP | 0600185 A1 | 6/1994 |
| EP | 0626350 A1 | 11/1994 |
| EP | 0805124 A1 | 11/1997 |
| FR | 2558149 A1 | 7/1985 |
| GB | 1474663 | 5/1977 |
| JP | S4934173 B1 | 9/1974 |
| JP | S63166728 A | 7/1988 |
| JP | S6418132 U | 1/1989 |
| WO | 2008016482 A1 | 2/2008 |
| WO | 2016181071 A1 | 11/2016 |

* cited by examiner

GOB DISTRIBUTOR FOR A MACHINE FOR FORMING GLASS ARTICLES

CROSS-REFERENCE TO RELATED APPLICATIONS

This application is the United States national phase of International Application No. PCT/MX2017/000087 filed Aug. 2, 2017, and claims priority to Argentina Patent Application No. 20170100725 filed Mar. 23, 2017, the disclosures of which are hereby incorporated by reference in their entirety.

FIELD OF INVENTION

The present invention refers to a gob distributor for glassware forming machines, which effectively and efficiently regulates the different moves of the distribution chutes towards the respective glassware forming stations. The gob distributor is reduced in size and is more easily built than any other known gob distributor.

BACKGROUND OF THE INVENTION

In the manufacture of glassware or other materials, it is necessary to dose or deliver gobs or portions of molten glass for the manufacture of glassware.

These portions of glass are obtained from a glass melting source that provides a continuous flow of glass, which is continuously cut, by means of a suitable cutting mechanism, into portions called "gobs", which are distributed by means of a gob distributor in one or more cavities of a plurality of glassware forming stations, generally six, eight, ten or twelve, which constitute the machine, with the advantage that the distribution can be reprogrammed in the event of malfunction, maintenance of any section or by under stretching of glass.

The known gob distributors of the prior art usually contain one or more movable chutes, each supported with an axis shaft. These chutes are aligned in manner that they move through suitable gear-based mechanisms, these mechanisms are controlled by a moving cam that causes chutes to move together between one glassware forming station and the next, in a predetermined glass gob delivery sections of the machine.

As an example of distributors of the prior art, we can cite the one illustrated in U.S. Pat. No. 3,597,187, granted on Aug. 3, 1971 to Urban P. Trudeau and assigned to Owens Illinois Co. This distributor consists of a pair of curved deflector scoops supported by vertical shafts that, through suitable gears, are radially moved by means of a crown supported on a vertical axis sequentially moved through a predetermined rotation angle, by means of a transverse piston rod containing a cam follower. This stem is supported by a control cam that, according to its profile, makes curved deflector scoops move radially between one molding station and the next, to deliver the gobs through a series of fixed channels that guide them towards the molds of each forming stations of the machine. The control cam is turned at the same time by means of a crown and a screw, which is coupled to a shaft. The shaft is rotated by a synchronous motor that rotates the cam at a constant speed, synchronized with operating controls, for example, a timing drum controlling several operations on each station of the forming machine.

Another type of gob distributor is illustrated in U.S. Pat. No. Re28759 granted to Wasyl Bystrianyk et al on Apr. 6, 1976, and assigned to Emhart Corporation. This patent also describes a distributor of molten glass gobs which comprises a pair of curved scoops, each of which is coupled to a sprocket, and to a rack, allowing them to move angularly and in unison between one position and another to several stations of a glassware forming machine. The rack is also coupled to a shaft, which at its free end is equipped with a cam follower, which is also moved by another cam follower that rests on a suitable cam, that in this particular case the cam is horizontal. The cam is driven by transmission means connected to a synchronous motor rotating the cam in synchrony with the operating controls of several forming sections of the forming machine.

The gob distributors known in the prior art already eliminate the use of a drive cam to control the movement of the mobile channels of a glass gob distributor and, instead, use electronic or stepping motors, as well as an electronic control system, as illustrated in U.S. Pat. No. 4,357,157, granted to Luis Cardenas Franco, et al, on Nov. 2, 1982, and assigned to Investigacion FIC Fideicomiso. In this case, the distributor includes a pair of curved distribution scoops, arranged one behind the other, the front scoop is provided with a ring support resting on a shaft, while the rear scoop passes through said ring and resting on a second shaft, to achieve the rotation movement at predetermined angles. The distribution scoop shafts pass through a common support and coupled by means of appropriate couplings to stepping motors, which run completely independently by providing motions perfectly measured by the number of steps fed to each motor. In this case, stepper motors are operated by an electronic control system synchronizing the delivery movement of the scoops with respect to each section of the forming machine.

Another gob distributor of the type using programmable means is described in the U.S. Pat. No. 4,687,502 granted to Robert J. Douglas et al., and assigned to Emhart Industries. This distributor includes a modification to the distribution system described in U.S. Pat. Re 28,759, assigned to such company. In accordance with the invention, the main features of said gob distributor include the use of a servomotor, which is a direct current reversible motor, to position a rack and control the angular movement of the curved gob delivery scoops. A servo motor is controlled by a servo position control mechanism, which is also controlled by the motion profile through a computer that can be manually adjusted. This gob distributor can be considered to be manufactured in two sections, a replaceable section that includes a housing with a pair of toothed sprockets respectively coupled to a pair of feed chutes. These pinions are also coupled with a rack, which makes the scoops move angularly between one position and another; and a fixed section containing a servo motor and a rotary linear motion impeller, which can be coupled to the main structure of the glassware forming machine.

Finally, in U.S. Pat. No. 5,637,128 by Gaspar Rodriguez Wong et al, assigned to Vidriera Monterrey, refers to a gob distributor for glassware forming machines or other materials, which includes: at least one curved distribution scoop mounted on a vertical rotary axis for each gob simultaneously supplied by a distributor, each scoop has its upper end aligned at all times with each respective hole of the glass molten gob feeder and moves radially so its end matches in a predetermined order with the upper ends of the fixed channels of a forming machine which carry the gobs to the respective molds of the sections of such machine; a housing is composed of at least one gear which rotates on its axial axis, in conjunction with a central shaft coupled to the housing which are joined together with the vertical axis of each distribution scoop; a rack coupled to match the gears of each distribution scoop to move these gears with a rotational movement and thus provide a simultaneous and synchronized rotation to each scoop; and, a rotary driving member coupled to said rack, allowing a forward and backward movement to said rack and thereby carry out a rotational movement of said gears; drive media coupled to the drive member to impart rotational motion to the drive member to move the rack and consequently simultaneously and angularly move the curved scoops to selective delivery positions in a scheduled sequence with accurate movements between different sections of the glassware forming machine.

With the arrival of the electronic controls, the motion control of the curved scoops can be handled with great security, and the angular position programming (adjustment) can be easily controlled.

However, one of the problems that still persist with known gob distributors is their mechanical structure, since they are manufactured with a large number of mechanical parts such as connecting plates, guiding rods and other additional parts that significantly increase their size and weight.

In addition to the above, and due to the large number of parts comprising the prior art gob distributors, has a disadvantage of increased wear on all parts. This causes backlash problems, which cause sudden moves at the time of delivery, which cannot be easily corrected by electrical or electronic controls.

SUMMARY OF THE INVENTION

It is first objective of the present invention to provide a gob distributor for glassware forming machines, which has a compact construction and improves the motion control and the position of distribution scoops.

Another objective of the present invention is to provide a gob distributor for glassware forming machines, which accepts different motion orders for the distribution scoops without having the need to disassemble the mechanism.

An additional objective of the present invention is to provide a gob distributor for glassware forming machines which, since it is built in a more compact form (reducing its length and size to almost half of the known distributors), reduces the problem of wear mechanisms, thus avoiding problems of sudden motions during the distribution of the gobs to the different sections of the glassware forming machine.

An additional objective of the present invention is to provide a gob distributor for glassware forming machines, which can be easily modified to convert it for use in double, triple or quadruple cavity.

An additional objective of the present invention is to provide a gob distributor for glassware forming machines that, since each shaft and their respective motor are independent allowing to perfectly align each scoop from double cavity with each parison mold, maintaining a perfect alignment for a perfectly centered load.

Another objective of the present invention is to provide a gob distributor for glassware forming machines where the scoop holders or arms of each scoop move completely independently, each scoop holder being inserted in the opposite direction to the other at 180° and in a relation one to the other, allowing a greater fan angle equal to or greater than 140°, which is superior to those made by the distributors of the previous art. Yet another objective of the present invention is to provide a gob distributor for glassware forming machines, which provides a motion of the distribution scoops with no sudden changes of acceleration.

BRIEF DESCRIPTION OF THE DRAWINGS

The novel aspects considered characteristic of the present invention are established in particular in the annexed claims. Nevertheless, the invention itself, due to its organization or the operational method, in conjunction with other objects and advantages of the same, will be better understood through the following description, when read in relation to the accompanying drawings, in which:

DETAILED DESCRIPTION OF THE INVENTION

Figure 1:
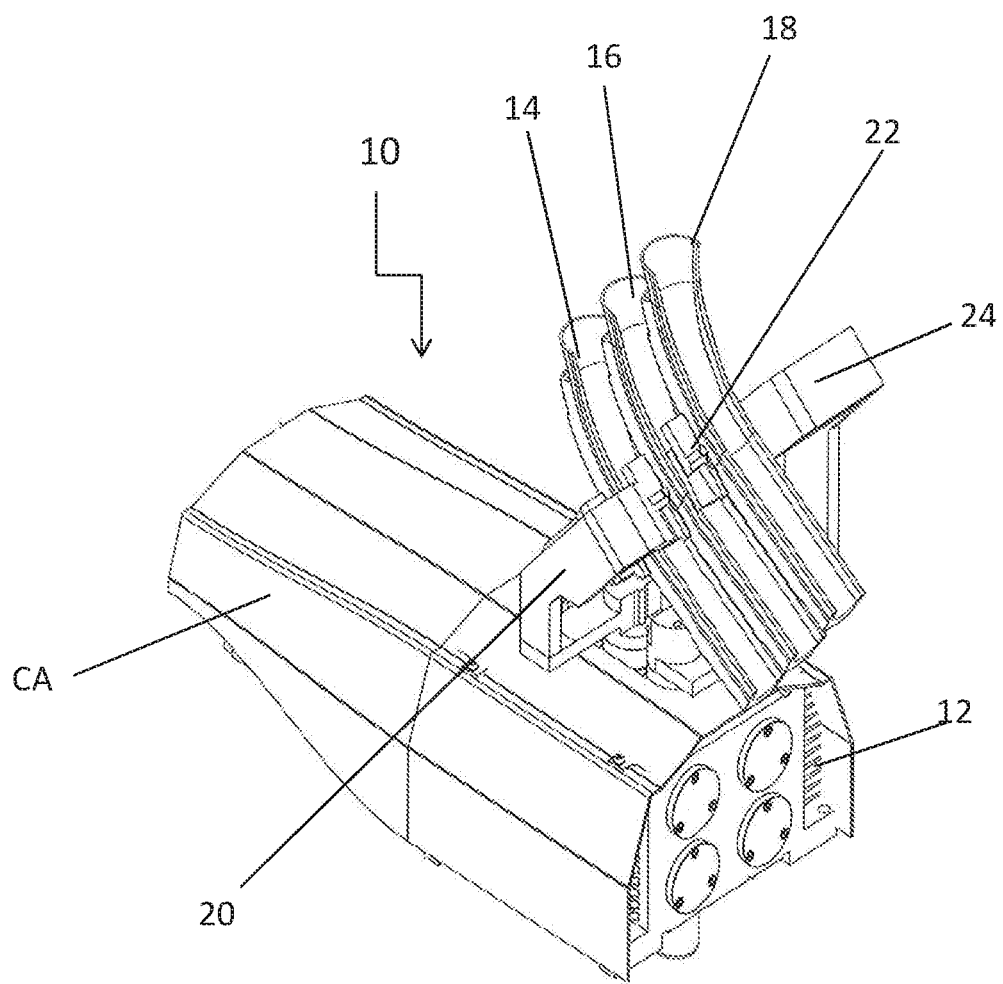
FIG. 1 is a conventional frontal perspective view of the glass gob distributor of the present invention.

Referring to the FIG. 1, the gob distributor 10 of the present invention is shown, which includes: a housing 12 which is protected by a cover CA. In this embodiment, the gob distributor 10 is shown to retain three delivery scoops 14, 16, 18, in an arcuate shape, these being positioned one above the other. Each scoop 14, 16, 18, having its upper end to match with each of the feeding orifices of a glass feeder (not shown) and its lower ends directed towards molds for forming glassware. Each scoop 14, 16, 18, being supported by independent holders 20, 22, 24, to radially move to the left or to the right.

Figure 2:
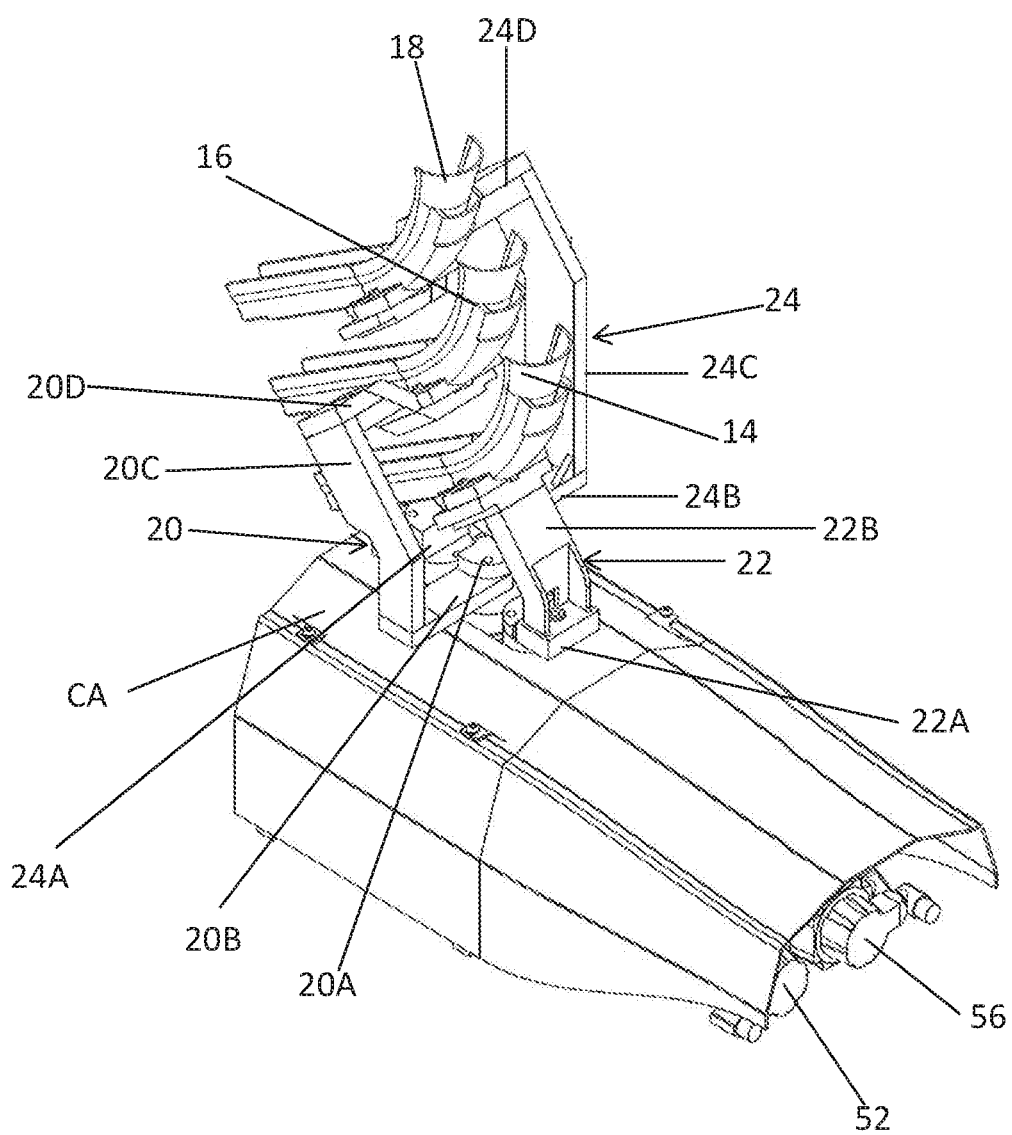
FIG. 2 is a conventional perspective view, showing the back side of the glass gob distributor of the present invention.
Figure 3:
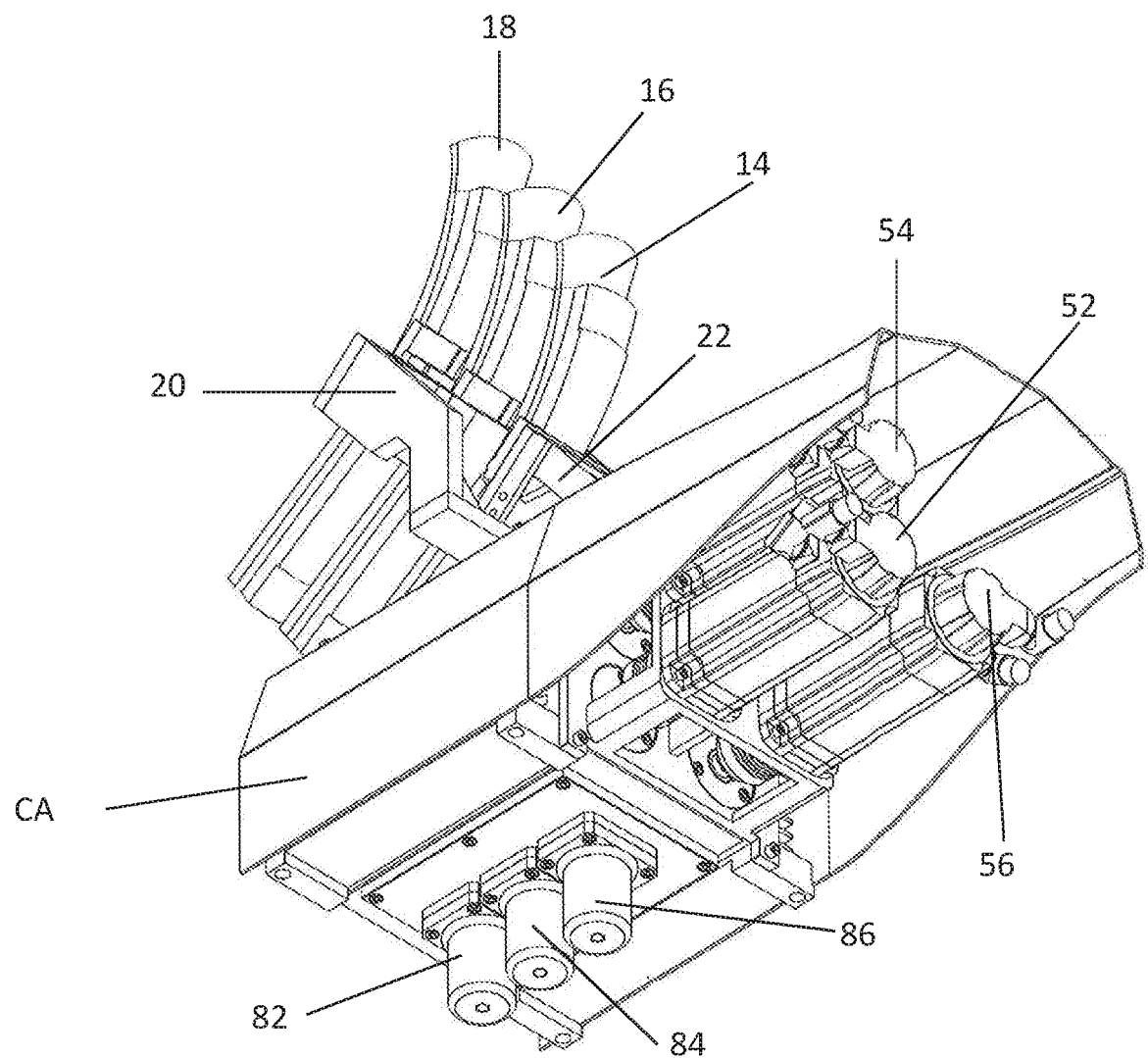
FIG. 3 is a conventional perspective view, showing the lower side of the glass gob distributor of the present invention.

As shown in FIG. 2, a first scoop holder 22 is located at the back, to retain scoop 14; and, scoop holders 20 and 24, are aligned to the front of the first scoop holder 22, one behind the other.

Each set of scoop holder 20, 22, 24, and scoops 14, 16, 18, move independently, one from the other. At least two scoop holders 20, 24, being interspersed in an opposite position (in a direction opposite to the other at 180°) and in a relationship one below the other, in a staggered form, allowing a greater fan angle equal to or greater than 140°, which is higher than those made by the distributors of the prior art.

Figure 4:
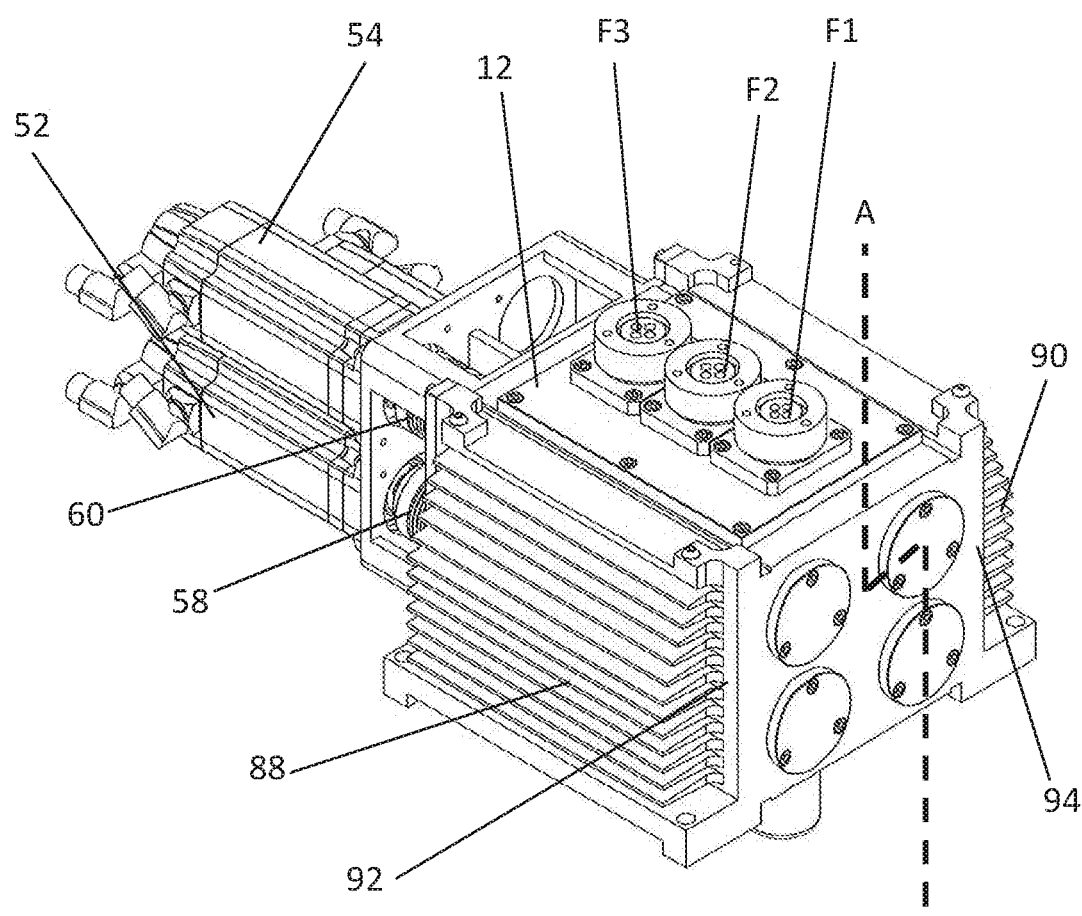
FIG. 4 is a conventional frontal perspective partial view of the glass gob distributor of the present invention.
Figure 5:
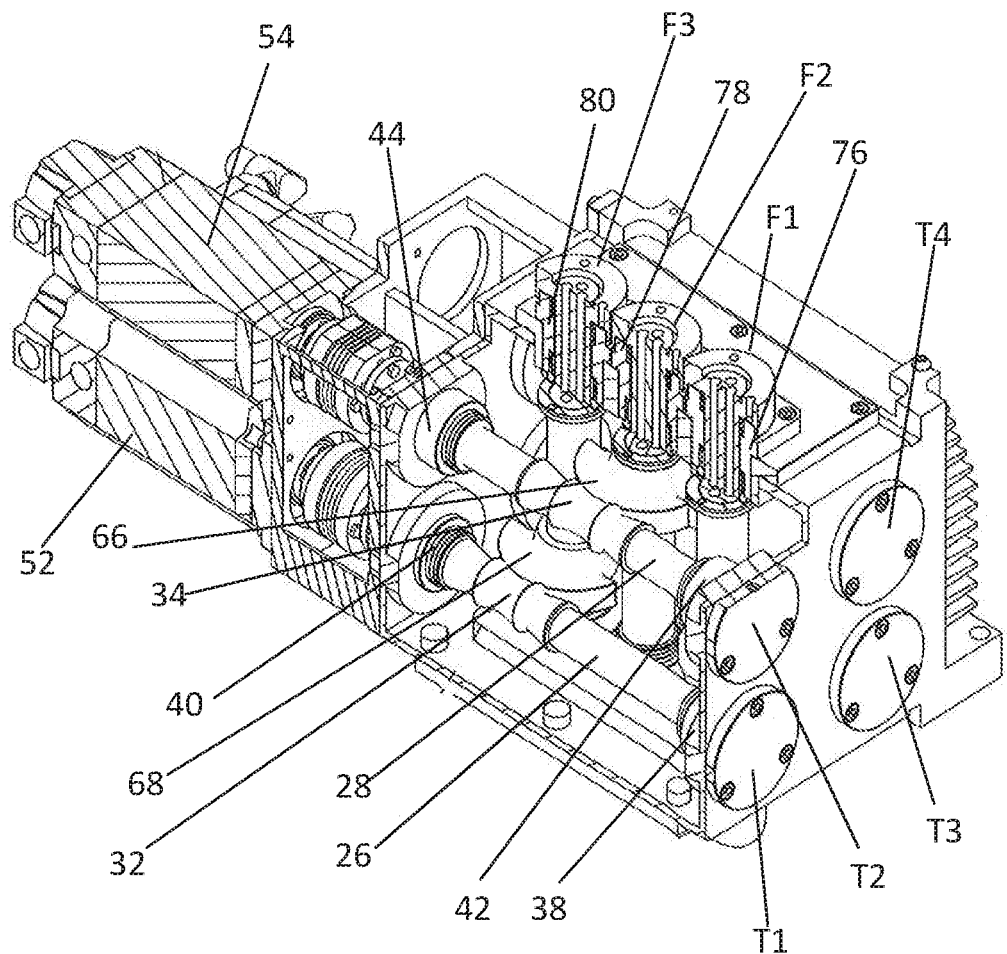
FIG. 5 is a conventional, frontal perspective view, taken from the A-AA line, showing in detail the internal part of the glass gob distributor of the present invention.
Figure 6:
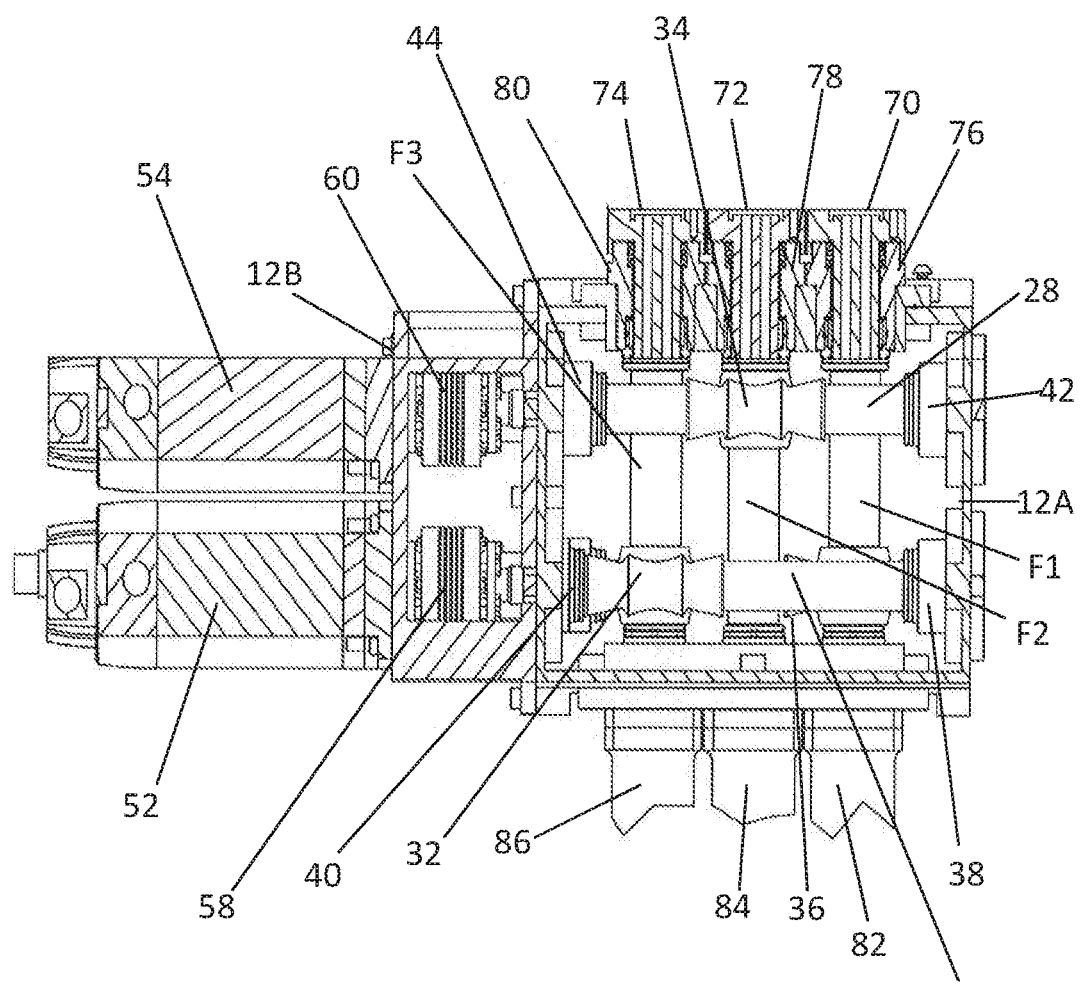
FIG. 6 is a cross-sectional view, taken from FIG. 5, showing in detail the inner part of the glass gob distributor of the present invention.
Figure 7:
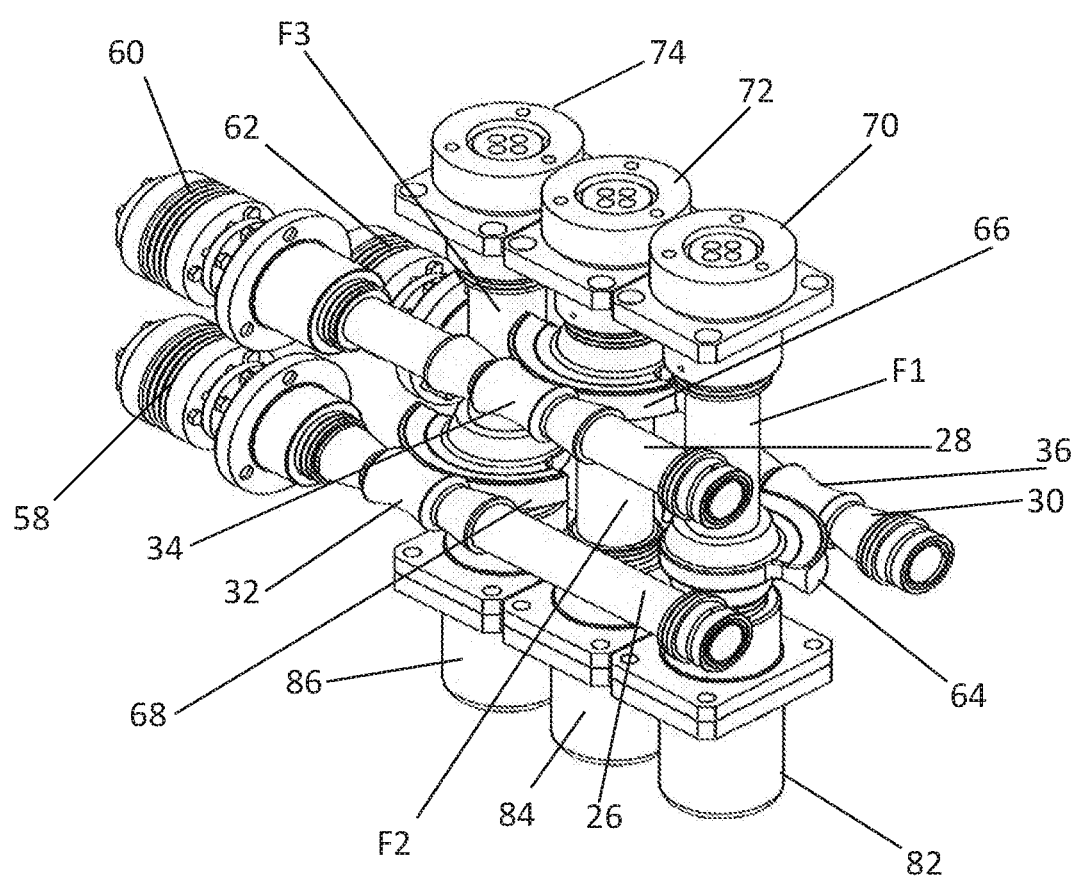
FIG. 7 is a conventional perspective view, in detail, taken from FIG. 5, showing the inner part of the gob distributor of the present invention.
Figure 8:
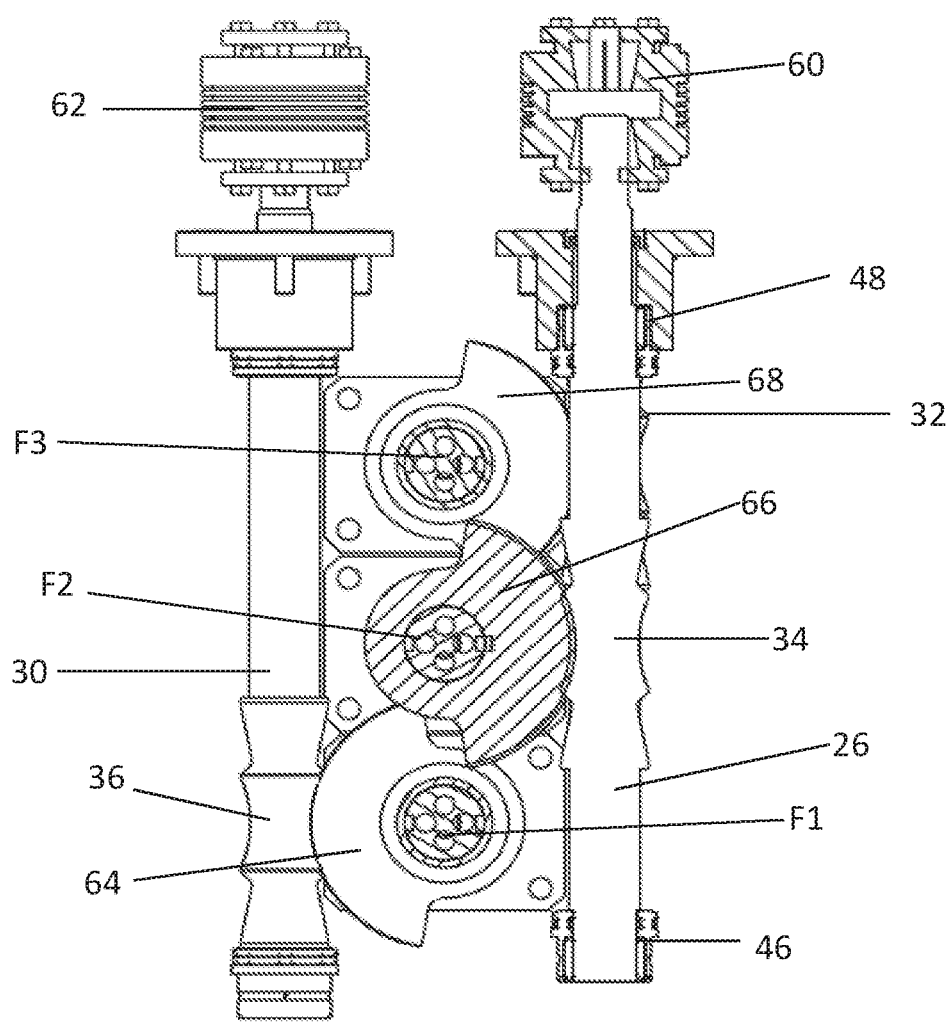
FIG. 8 is a detailed top floor view showing an internal section of the gob distributor of the present invention.

These scoop holders 20, 22, 24, will be coupled to shafts F1, F2, F3 (illustrated in FIG. 4), which will be described in more detail below, to radially move scoops 14, 16 and 18, so they distribute glass gobs to each section of a glassware forming machine (not shown).

In particular reference to each scoop holder 20, 22 and 24, as shown in FIGS. 1 and 2, the scoop holder 22 located in the center includes: a support base 22A and an arm 22B, which is projected inclined upwards and forwards to engage the lower middle part of scoop 14. The scoop holder 20 includes: a support base 20A; a first arm 20B connected to the support base 20A that projects horizontally from the center outward; a second arm 20C is connected outside end of the first arm 20B, which is projected vertically upwards and continues inclined forward, until a higher level above the middle part of the scoop 14 is reached; and finally, a third arm 20D connected to the upper end of the second arm 20C, which is projected horizontally inward to engage the lower part of scoop 16. Finally, scoop holder 24 includes: a support base 24A, a first arm 24B connected to the support base 24A that projects horizontally from the center outward, in opposite relation to arm 20B; a second arm 24C is connected outside end of the first arm 24B, which is projected vertically upwards and continues inclined forward, until a higher level above the middle part of the scoop 16 is reached. It is important to clarify that even when scoops holders 20, 24, show a semi-rectangular structure, these can be in the shape of "C" or other similar shapes.

Continuing with the description of each part of the gob distributor 10 of the present invention, FIGS. 4, 5, 6 and 7, show the housing 12, similar to a quadrangular prism, which has housed at least one shaft 26, 28, 30, in horizontal position, which have a built-in worm screw 32, 34, 36. Such shafts 26, 28, 30, are equidistantly distributed in housing 12, two lower in parallel position, for example, shaft 26 and 30 and one located in the upper part, for example, shaft 28. Both ends of shafts 26, 28, 30 are connected by means of ball bearings 38, 40, 42, 44, 46, 48, between front face 12A and rear face 12B of housing 12 (FIG. 6), to freely rotate. Bearings 38, 40, 42, 44, 46, 48, including projections increasing rigidity of shafts 26, 28, 30. Caps T1, T2, T3, located on front face 12A of housing 12, cover bearings 38, 42, 46. It should be noted that housing 12 includes a cap T4, to fit a fourth shaft (not shown) in case of a gob distributor 10, for enlargement to four scoops.

The shaft ends 26, 28, 30 located on back face 12B of housing 12 are connected to servomotors 52, 54 and 56 by means of flexible or bellows couplings 58, 60, 62, to rotate shafts 26, 28, 30 on their own axis with a rotating movement to the left or right.

In the FIGS. 5, 6, 7 and 8, shafts F1, F2 and F3, are located in housing 12, in a perpendicular position with respect to shafts 26, 28 and 30, located and aligned equidistantly, one after the other, along housing 12. These shafts F1, F2, F3, are located in the central part of the parallelism formed by shafts 26 and 30 and aligned in the upper part with shaft 28. Each F1, F2 and F3 shafts, including a 64, 66 and 68 segmented fan-shaped crown. Segmented crowns 64, 66 and 68 are assembled with a built-in worm screws 32, 34, 36, forming a worm gear (or a double-wrapping transmission) for that, by means of a rotating movement of the servo motors 52, 54 and 56, shafts 26, 28, 30, transmit their movement to shafts F1, F2 and F3, and move scoops 14, 16, 18 radially with a movement to the left or right. Each shaft F1, F2 and F3 and 26, 28, 30, are coupled in pairs, in a perpendicular position with each other, to independently move each scoop 14, 16, 18.

The shafts F1, F2, F3, include in their upper end and scoop support 70, 72, 74 on which each independent scoop holder 20, 22, 24 are coupled.

The upper end of each shaft F1, F2, F3, through the scoop support 70, 72, 74, is assembled to housing 12, through axial needle roller bearings 76, 78, 80, located in the upper part of housing 12.

Axial needle roller bearings (not shown) located at the bottom of housing 12 are also used to assemble the lower end of each shafts F1, F2, F3. The latter covered by a cylindrical housing 82, 84, 86.

Finally, housing 12 includes cooling fins 88, 90, on their side faces 92, 94, which are protected by a cover CA. These cooling fins 88, 90, are formed along housing 12 to increase heat transfer and cool surface of housing 12.

Figure 9:
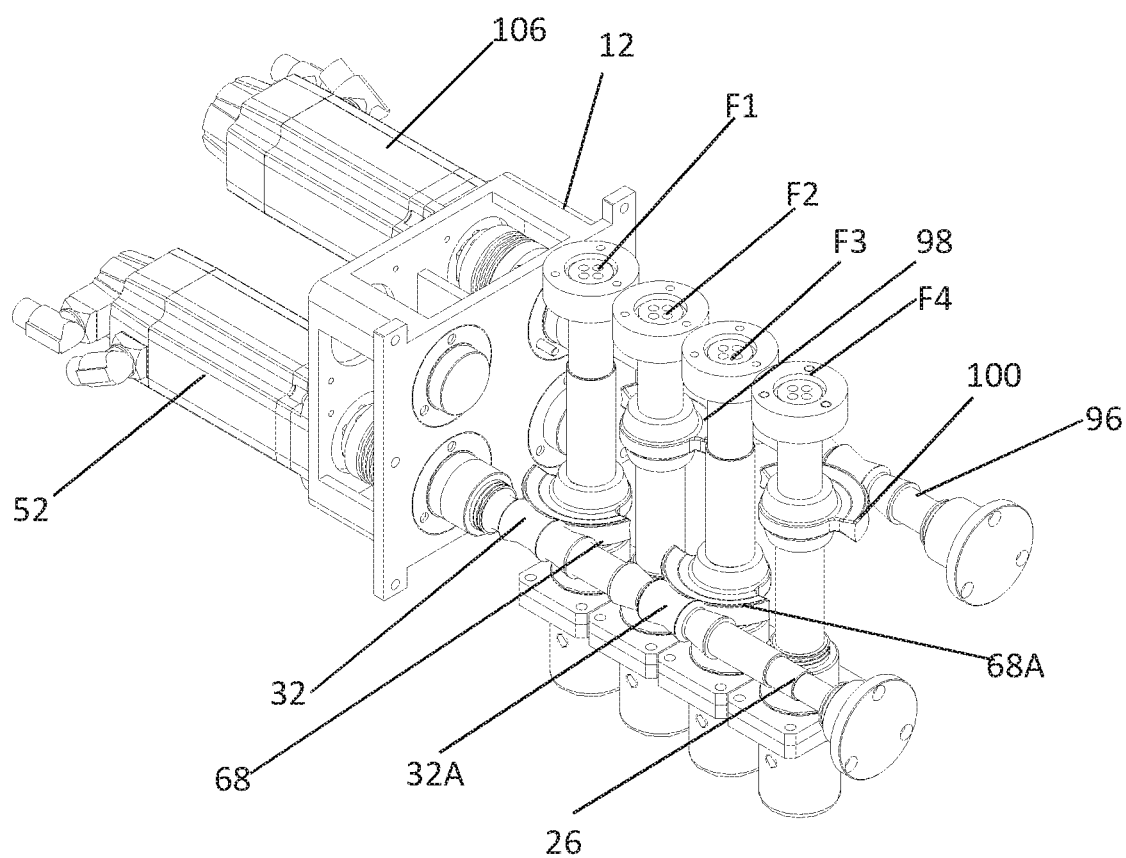
FIG. 9 is a conventional perspective view, showing a second embodiment of the gob distributor, for four scoops of the present invention.
Figure 10:
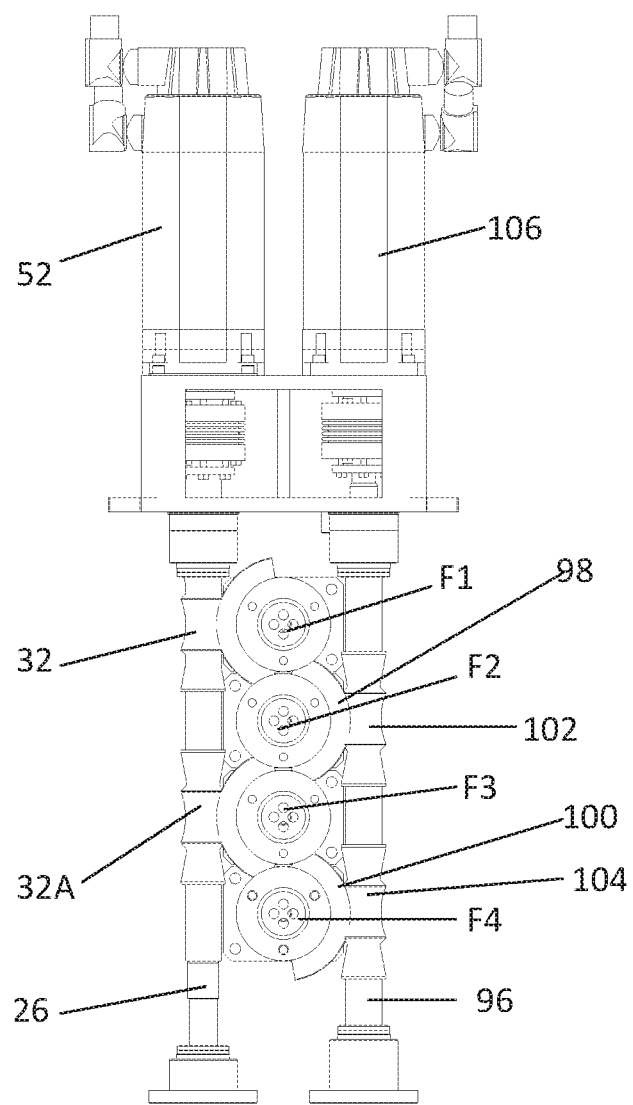
FIG. 10 is a detailed top floor view showing an internal section of the second embodiment of the gob distributor, for four scoops of the present invention.

Referring now to a second embodiment of the present invention, shown in FIGS. 9 and 10, four shafts F1, F2, F3, F4, are shown in vertical position, which are located in housing 12, in perpendicular position with respect to shaft 26 and shaft 96. These shafts F1, F2, F3, F4 are located in the central part of parallelism formed by shafts 26 and 96. Shaft 26 is placed on the first side of shafts F1, F2, F3 and F4, and aligned at the bottom of shafts F1, F2, F3 and F4. Shaft 96 is placed on the opposite side of shafts F1, F2, F3 and F4, and aligned at the top.

Shafts F1 and F3, including a segmented fan-shaped crown 68, 68A. The segmented crowns 68, 68A, being assembled with each enveloping worm screws 32, 32A, forming a worm gear (or a double enveloping transmission) so that by means of the rotational movement of servomotor 52, transmit their movement to shafts F1 and F2, and move a pair of scoops, for example, first scoop 14 and third scoop 18, radially with a movement towards left or right.

Shafts F2 and F4, including a segmented fan-shaped crown 98, 100. Segmented crowns 98, 100A, are assembled with each enveloping worm screws 102, 104, forming a worm gear (or a double enveloping transmission) so that, by means of the rotational movement of servomotor 106, transmit their movement to shafts F2 and F4, and move a of scoops, for example, second scoop 16 and fourth scoop (not shown), radially with a movement towards left or right.

From the second embodiment, can be seen the motor 52 moves with shaft 26, two enveloping worms screws 32, 32A, to simultaneously move two shafts F1 and F3. Motor 106 moves with shaft 96, two enveloping worm screws 102, 104, to simultaneously move two shafts F1 and F3. In this schematic and in an embodiment on this case, for a triple cavity system, a motor 52 can be connected by means of shaft 26 with shafts F1 y F3, and motor 106 can be connected to shaft 96 to move shaft F2. For a double cavity system, for example, a motor 52 connected to shaft 26 can be used to move shafts F1 and F2. In this last version shafts F1 and F2 would each comprise a gear segment (not shown) to simultaneously move two scoops (not shown).

Figure 11:
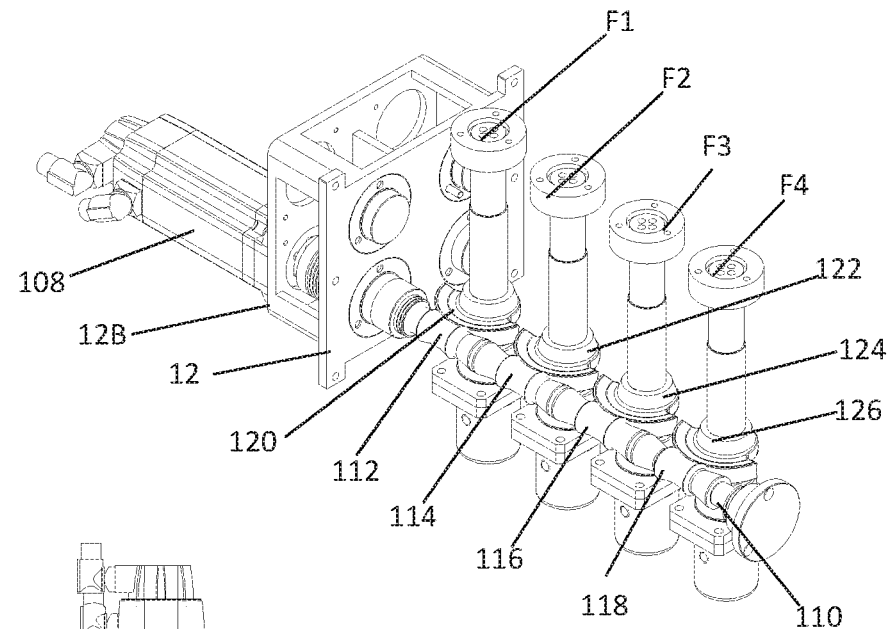
FIG. 11 is a conventional perspective view, showing a third embodiment of the gob distributor, for four scoops of the present invention.
Figure 12:
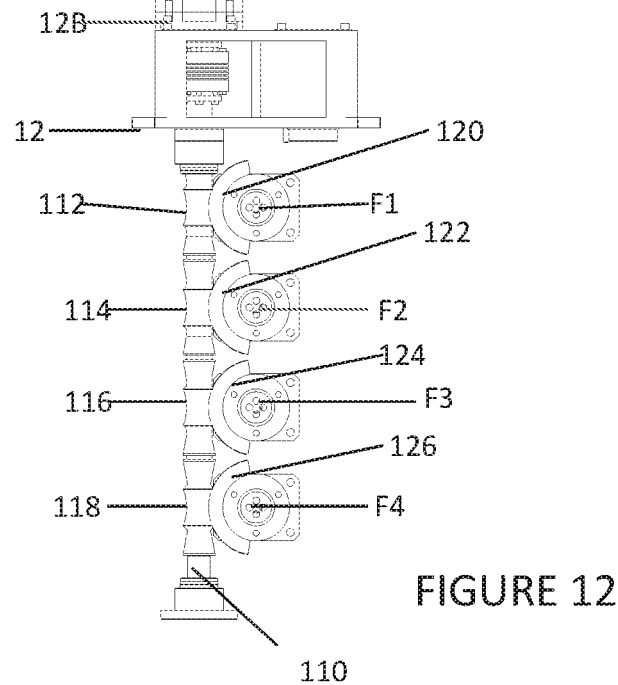
FIG. 12 is a detailed top floor view showing an internal section of the third embodiment of the gob distributor, for four scoops of the present invention; and, FIG. 13 is a conventional perspective view of a pivoting support structure, where the gob distributor of the present invention is placed.

Finally, referring to a third embodiment illustrated in FIGS. 11 and 12, a motor 108 coupled to the rear 12B of housing 12 is shown. Motor 108 has a horizontal shaft 110 which in this particular embodiment includes four surrounding worms screws 112, 114, 116, 118. The four shafts F1, F2, F3 and F4, including each one of the gear segments 120, 122, 124, 126, which are respectively couples with each enveloping worms screws 112, 114, 116, 118. By means of this arrangement shaft 110 simultaneously moves four enveloping worm screws 112, 114, 116, 118, to move in synchrony four scoops (shown). In this arrangement, scoops two, three or four can be moved in synchrony.

As can be observed from the different embodiments of the gob distributor 10 of the present invention, by means the independent motorization of each scoop 14, 16, 18, the rotation movement of each one of them, can be programmed in independent form, correcting any displacement or desynchronization of scoops 14, 16, 18. Servomotors 52, 54, 56, 108, are connected through their respective connections to an electronic control system (not shown). This way, servomotors 52, 54 and 56 will receive the motion signal from the control system, in order to operate in a pre-established sequence the delivery motion of each 14, 16, 18 scoopers to each article forming sections of a forming machine (not shown).

So when the control system is started to move each scoop 14, 16, 18, each servomotors 52, 54, 56, receives a sequence of movement according to a pre-established programming in this control system. Therefore, each servomotor 52, 54, 56, depending on the movement profile stored in that control system will rotate on its own axis each shaft 26, 28, 30, and their enveloping worms screws 32, 34, 36, with a rotational motion to the left and to the right. The shafts 26, 28, 30 motion are transmitted to shafts F1, F2, F3, by coupling each worm screws 32, 34, 36, with each segmented crowns 64, 66 and 68, of each shaft F1, F2 and F3. Then shafts F1, F2 and F3, move with a movement to the left or to the right, creating a radial movement of scoops 14, 16, 18, to the left or to the right, in a determined and synchronized sequence to deliver gobs to each forming sections of a glass article forming machine (not shown).

Figure 13:
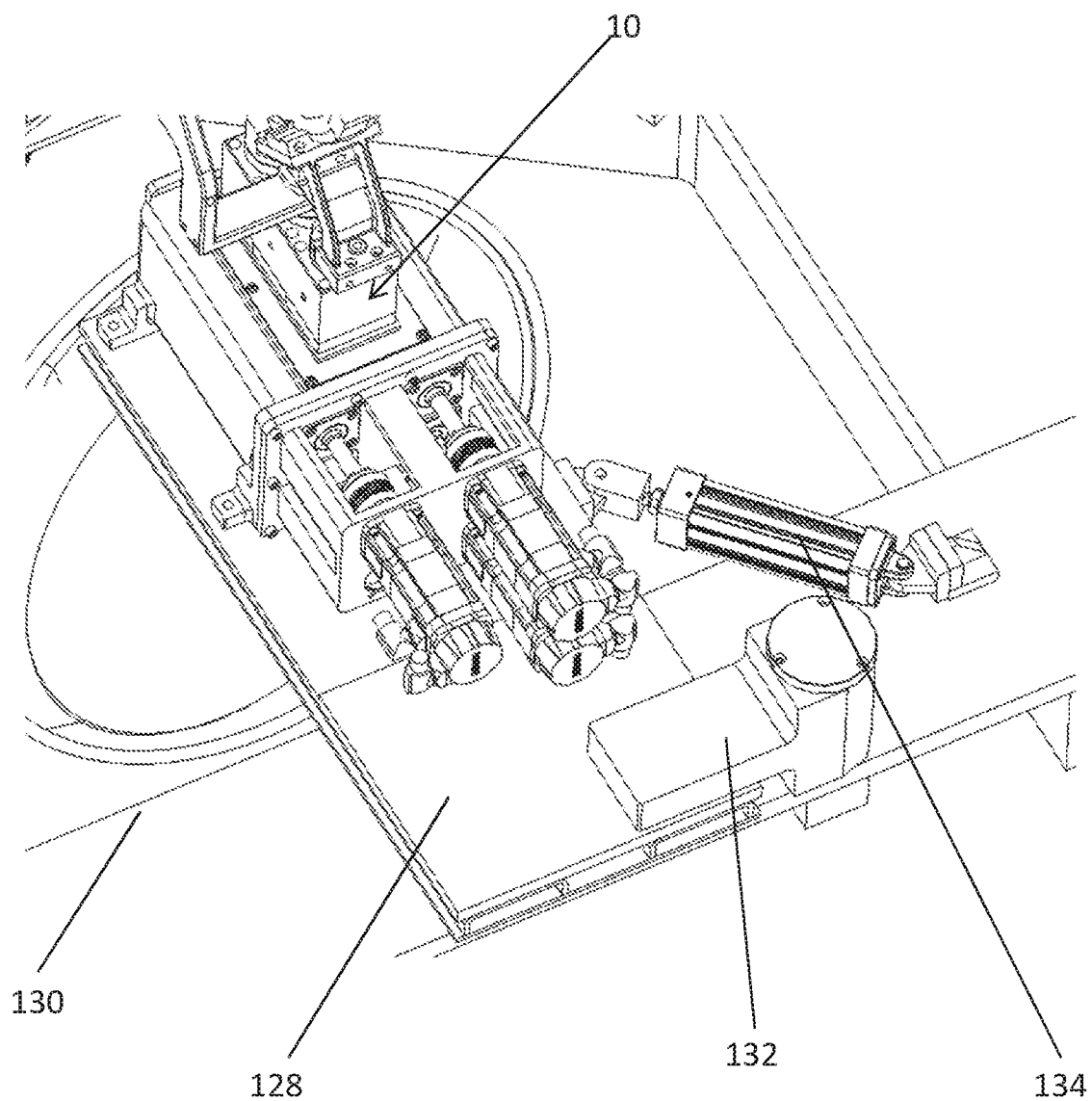

Finally, as shown in FIG. 13, the gob distributor 10 of the present invention can be placed on a movable platform 128, which is placed on top of a support structure 130 of the glassware forming machine.

This movable platform 128 is coupled by one end to a pivot element 132, which is fixed to the support structure 130. A cylinder-piston mechanism 134 is connected between one side of the movable platform 128 and the support structure 130 to move the movable platform 128 with a lateral movement outwards or inwards. This movement is important because in case of maintenance of the machine, the gob distributor is out of contact with the flow of molten glass from a glass feeder and this is directed to a direct discharge tank (not shown).

As shown in embodiment described above, a compact gob distributor 10 has been illustrated to distribute three glass gobs at the same time to each machine section. However, as discussed in the description, distributor 10 can easily be modified to use two and four scoops, depending on the number of molds of each forming machine, which can be double, triple or quadruple cavity.

Finally, it must be understood the invention must not be limited to the embodiments set forth in the foregoing and will be apparent to a specialist in the matter, other mechanical provisions may be implemented such as alternative performances, which will be clearly contained within the true spirit and scope of the invention, which is claimed in the following claims.

The invention claimed is:

1. A gob distributor for a glassware forming machine, comprising:
a housing;
at least one arcuate or straight scoop located above the housing, wherein each scoop has an upper end aligned at all times with at least one orifice of a feeder, wherein each scoop moves radially so that a lower end of each scoop coincides, in a predetermined order, with upper ends of straight or curved fixed channels of the forming machine, to conduct gobs towards article forming molds;
at least one independent supporting structure, where one independent supporting structure is connected to each scoop;
at least one first shaft vertically placed within the housing, wherein each first shaft can rotate on each first shaft's own axis, wherein one upper end of each first shaft extends outside the housing to connect to each independent supporting structure; wherein each first shaft comprises a first gear section for motion transmission;
at least one second shaft placed horizontally or vertically within the housing, wherein each second shaft can rotate on each second shaft's own axis, wherein one end of each second shaft extends out of the housing; wherein each second shaft comprises a second gear section for motion transmission; wherein each first gear section of each first shaft and each second gear section of each second shaft are coupled together to form a coupling gear; and,
at least one motor coupled at each end of each second shaft outside the housing so that, by means of a rotational movement of the at least one motor to the left or to the right, transmit a movement to each first shaft, to simultaneously move the support structures and scoops, radially, with a movement to the left or right to selective delivery positions, with a programmed sequence to each section and molds of the forming machine in an exact and precise position,
wherein the coupling of the first gear section for motion transmission of the first shaft and the second gear section for motion transmission of the second shaft form a double-envelope transmission,
wherein the at least one first shaft comprises at least two first shafts vertically placed within the housing which are aligned along a central part of the housing and equidistantly distributed from one another in a position one behind the other; and, wherein the at least one second shaft comprises at least two second shafts in a horizontal position and are distributed in the housing in a parallel position, one above the other; the second shafts being placed on opposite sides of the first shafts, each of said first shafts and each of said second shafts are coupled in pairs in a perpendicular position with each other to move independently each scoop.

2. The gob distributor as claimed in claim 1, wherein the at least one motor comprises at least one servomotor.

3. The gob distributor as claimed in claim 1, wherein the first gear section for transmission of movement of the first shaft is a fan-shaped gear sector.

4. The gob distributor as claimed in claim 1, wherein the second gear section for transmission of movement of the second shaft is an envelope worm.

5. The gob distributor as claimed in claim 1, wherein the at least one independent supporting structure comprises at least two independent supporting structures, placed in opposite positions from one another relative to a central part of the housing and one underneath the other, in staggered form to retain the scoops.

6. The gob distributor as claimed in claim 1, wherein the at least one independent supporting structure comprises at least two independent supporting structures in "C" form.

7. The gob distributor as claimed in claim 1, wherein at least one of the independent supporting structures comprise: a support base connected at the upper end of the first shaft in a vertical position; and an arm inclined projected upwards and forwards relative to a central part of the housing to be coupled at or below a middle part of a first scoop.

8. The gob distributor as claimed in claim 1, wherein at least one of the independent supporting structures comprises: a support base connected at a top end of the first shaft placed in a vertical position; a first arm connected to the support base, wherein the first arm is horizontally projected from a central part of the housing outwards; a second arm connected to an outside end of the first arm, which is vertically projected upwards and then inclines forward relative to the central part of the housing, until a higher level above a middle part of a first scoop is reached; and, a third arm connected at an upper end of the second arm, which is horizontally projected inward to couple to a bottom of a second scoop.

9. The gob distributor as claimed in claim 1, wherein at least one of the independent supporting structures comprises: a support base connected at a top end of the first shaft placed in a vertical position; a first arm connected to the support base, wherein the first arm is horizontally projected from a central part of the housing outwards; a second arm connected to an outside end of the first arm, which is vertically projected upwards and then inclines forward relative to the central part of the housing, until a higher level above a middle part of a second scoop is reached; and, a third arm connected at an upper end of the second arm, which is horizontally projected inward to couple to a bottom of a third scoop.

10. The gob distributor as claimed in claim 1, wherein the top end of each first shaft comprises axial needle roller bearings located at a top of said housing.

11. The gob distributor as claimed in claim 1, wherein a bottom end of each first shaft comprises axial needle roller bearings located at a bottom of said housing.

12. The gob distributor as claimed in claim 1, wherein the housing comprises cooling fins, such fins are formed along the housing to increase heat transfer and cool the housing.

13. The gob distributor as claimed in claim 1, wherein the second gear section of each second shaft comprises two gear sections equidistantly distributed on the shaft for motion transmission.

14. The gob distributor as claimed in claim 1, wherein the second gear section of each second shaft comprises three gear sections equidistantly distributed on the shaft.

15. The gob distributor as claimed in claim 1, wherein the gob distributor further comprises:
a movable platform underneath the gob distributor and placed on top of a support structure of the forming machine;
a pivot element fixed to the support structure and coupled to the movable platform; and,
a cylinder-piston mechanism connected between the movable platform and the support structure to move the movable platform with a lateral movement outward or inward relative to the forming machine.

16. A gob distributor for a glassware forming machine, comprising:
a housing;
at least one arcuate or straight scoop located above the housing, wherein each scoop has an upper end aligned at all times with at least one orifice of a feeder, wherein each scoop moves radially so that a lower end of each scoop coincides, in a predetermined order, with upper ends of straight or curved fixed channels of the forming machine, to conduct gobs towards article forming molds;
at least one independent supporting structure, where one independent supporting structure is connected to each scoop;
at least one first shaft vertically placed within the housing, wherein each first shaft can rotate on each first shaft's own axis, wherein one upper end of each first shaft extends outside the housing to connect to each independent supporting structure; wherein each first shaft comprises a first gear section for motion transmission;
at least one second shaft placed horizontally or vertically within the housing, wherein each second shaft can rotate on each second shaft's own axis, wherein one end of each second shaft extends out of the housing; wherein each second shaft comprises a second gear section for motion transmission; wherein each first gear section of each first shaft and each second gear section of each second shaft are coupled together to form a coupling gear; and,
at least one motor coupled at each end of each second shaft outside the housing so that, by means of a rotational movement of the at least one motor to the left or to the right, transmit a movement to each first shaft, to simultaneously move the support structures and scoops, radially, with a movement to the left or right to selective delivery positions, with a programmed sequence to each section and molds of the forming machine in an exact and precise position,
wherein the coupling of the first gear section for motion transmission of the first shaft and the second gear section for motion transmission of the second shaft form a double-envelope transmission,
wherein the at least one first shaft comprises at least two first shafts vertically placed within the housing and aligned along a central part of the housing and equidistantly distributed from one another in a position one behind the other; and, wherein the at least one second shaft comprises two second shafts, in a horizontal position and distributed in the housing, in a parallel position, a first to a first side and in an upper part of the first shafts, and a second to a second side in a lower part of the first shafts, wherein the second gear section of each second shaft comprises at least two second gear sections for transmission of movement.

17. The gob distributor as claimed in claim 16, wherein each of the at least two second gear sections is coupled with one of the first gear sections of the at least two first shafts.

* * * * *